(12) United States Patent
Trotter et al.

(10) Patent No.: US 6,929,271 B2
(45) Date of Patent: Aug. 16, 2005

(54) HYDRAULICALLY COMPENSATED STABILIZER SYSTEM

(75) Inventors: Jason K. Trotter, Des Plaines, IL (US); Robert K. Dutzi, Palatine, IL (US); Thomas S. King, Northbrook, IL (US)

(73) Assignee: Illinois Tool Works Inc., Glenview, IL (US)

( * ) Notice: Subject to any disclaimer, the term of this patent is extended or adjusted under 35 U.S.C. 154(b) by 112 days.

(21) Appl. No.: 10/037,340

(22) Filed: Nov. 9, 2001

(65) Prior Publication Data

US 2003/0090080 A1 May 15, 2003

(51) Int. Cl.$^7$ .................................................. B60G 21/073
(52) U.S. Cl. ........................ 280/124.106; 280/124.161; 280/124.159; 188/322.22
(58) Field of Search .................... 280/124.104, 124.106, 280/124.159, 124.16, 124.161; 188/322.22; B60G 21/073

(56) References Cited

U.S. PATENT DOCUMENTS

| | | | | |
|---|---|---|---|---|
| 1,914,814 A | * | 6/1933 | Mercier ........................ 267/186 |
| 2,869,892 A | * | 1/1959 | Sahagian ...................... 280/5.5 |
| 3,399,905 A | * | 9/1968 | Vogel .................... 280/124.141 |
| 3,625,321 A | * | 12/1971 | Lutz ............................ 188/298 |
| RE27,623 E | * | 4/1973 | Millican .............. 280/124.141 |
| 3,736,000 A | * | 5/1973 | Capgras .................... 267/64.16 |
| 4,270,771 A | * | 6/1981 | Fujii ........................ 280/5.514 |
| 4,606,551 A | * | 8/1986 | Toti et al. ............. 280/124.161 |
| 4,607,861 A | * | 8/1986 | Eisenberg et al. ........ 267/64.11 |
| 5,058,868 A | * | 10/1991 | Sirven ......................... 267/259 |
| 5,066,041 A | * | 11/1991 | Kindermann et al. .... 280/5.506 |
| 5,087,073 A | * | 2/1992 | Lund ........................ 188/266.2 |
| 5,174,603 A | * | 12/1992 | Lund ........................ 188/266.2 |
| 5,447,332 A | * | 9/1995 | Heyring ............... 280/124.104 |
| 5,484,218 A | | 1/1996 | Fellows ........................ 403/12 |
| 5,489,161 A | | 2/1996 | Sugita et al. ................ 403/134 |
| 5,492,427 A | | 2/1996 | Ersoy et al. ................... 403/77 |
| 5,492,428 A | | 2/1996 | Hellon et al. ............... 403/122 |
| 5,498,092 A | | 3/1996 | Fellows ........................ 403/12 |
| 5,551,722 A | | 9/1996 | Schwartz et al. ........... 280/689 |
| 5,568,930 A | | 10/1996 | Urbach ........................ 277/29 |
| 5,601,305 A | | 2/1997 | Nordloh et al. ............. 280/674 |
| 5,609,433 A | | 3/1997 | Pazdirek et al. ............ 403/140 |
| 5,611,635 A | | 3/1997 | Schütt et al. ............... 403/141 |
| 5,615,967 A | | 4/1997 | Hellon ........................ 403/133 |
| 5,653,545 A | | 8/1997 | Moormann et al. ........... 403/50 |
| 5,672,023 A | | 9/1997 | Lieber et al. ............... 403/138 |
| 5,678,947 A | | 10/1997 | Urbach et al. .............. 403/288 |
| 5,713,689 A | | 2/1998 | Pazdirek et al. ............ 403/135 |
| 5,732,969 A | | 3/1998 | Spoto ......................... 280/689 |

(Continued)

FOREIGN PATENT DOCUMENTS

| | | | |
|---|---|---|---|
| DE | 100 00 199 A1 | * | 8/2000 |
| EP | 1 138 531 AI | * | 10/2001 |
| GB | 2 351 951 A | * | 1/2001 |
| JP | 2-296524 A | * | 12/1990 |
| JP | 11-291737 A | * | 10/1999 |
| JP | 2001-295876 | * | 10/2001 |

*Primary Examiner*—Ruth Ilan
(74) *Attorney, Agent, or Firm*—Fletcher Yoder (57) ABSTRACT

The present technique provides a stabilizer system comprising a plurality of piston cylinder assemblies, which have multiple interconnected chambers to provide cross compensation between suspension members coupled to those piston cylinder assemblies. The piston cylinder assemblies may have two or more chambers separated by pistons, which move in response to a load imposed on the suspension member coupled to that piston cylinder assembly. As the piston moves in response to movement of the corresponding suspension member, a fluid pressure is transmitted to another suspension member to distribute the load between the two suspension members.

52 Claims, 4 Drawing Sheets

U.S. PATENT DOCUMENTS

| | | | |
|---|---|---|---|
| 5,752,780 A | 5/1998 | Dorr | 403/135 |
| 5,755,526 A | 5/1998 | Stanevich | 403/122 |
| 5,782,573 A | 7/1998 | Dorr et al. | 403/135 |
| 5,782,574 A | 7/1998 | Henkel | 403/135 |
| 5,794,966 A * | 8/1998 | MacLeod | 280/5.507 |
| 5,813,698 A | 9/1998 | Spoto et al. | 280/772 |
| 5,813,789 A | 9/1998 | Prickler et al. | 403/135 |
| 5,823,306 A * | 10/1998 | de Molina | 188/322.15 |
| 5,836,606 A | 11/1998 | Spoto et al. | 280/718 |
| 5,851,082 A | 12/1998 | Schmudde et al. | 403/133 |
| 5,860,757 A | 1/1999 | Sugiura | 403/131 |
| 5,876,149 A | 3/1999 | Dorr et al. | 403/134 |
| 5,882,137 A | 3/1999 | Epp et al. | 403/135 |
| 5,927,891 A | 7/1999 | Trumbower et al. | 403/114 |
| 5,931,597 A | 8/1999 | Urbach | 403/134 |
| 5,954,353 A | 9/1999 | Kincaid et al. | 280/124.152 |
| 6,007,079 A | 12/1999 | Kincaid et al. | 280/93.511 |
| 6,007,080 A | 12/1999 | Kincaid et al. | 280/124.152 |
| 6,010,271 A | 1/2000 | Jackson et al. | 403/131 |
| 6,010,272 A | 1/2000 | Littman | 403/131 |
| 6,030,141 A | 2/2000 | Lieber et al. | 403/135 |
| 6,038,771 A | 3/2000 | Takehara et al. | 29/897.2 |
| 6,042,294 A | 3/2000 | Urbach | 403/135 |
| 6,076,840 A | 6/2000 | Kincaid et al. | 280/124.107 |
| 6,098,287 A | 8/2000 | Takahashi et al. | 29/898.043 |
| 6,113,302 A | 9/2000 | Buhl | 403/133 |
| 6,116,113 A | 9/2000 | Pazdirek et al. | 74/579 R |
| 6,161,451 A | 12/2000 | Gleason, II | 74/579 R |
| 6,171,012 B1 | 1/2001 | Westphal | 403/137 |
| 6,267,387 B1 * | 7/2001 | Weiss | 280/5.52 |
| 6,270,098 B1 * | 8/2001 | Heyring et al. | 280/124.161 |
| 6,296,235 B1 * | 10/2001 | Dalal | 267/64.16 |
| 6,318,742 B2 * | 11/2001 | Franzini | 280/124.106 |
| 6,517,094 B1 * | 2/2003 | Kincaid et al. | 280/124.106 |
| 2001/0006285 A1 * | 7/2001 | Franzini | 280/124.106 |
| 2002/0027051 A1 * | 3/2002 | Grundei | 188/322.15 |

* cited by examiner

FIG. 10

HYDRAULICALLY COMPENSATED STABILIZER SYSTEM

BACKGROUND OF THE INVENTION

The present invention relates generally to the field of linkage control systems, and more particularly to stabilizers for vehicle suspension systems. In the present invention, hydraulic assemblies are coupled to a plurality of movable suspension members to control movement between the movable suspension members.

All vehicles generally have some sort of suspension system to control movement of the vehicle during maneuvering, traveling through various terrains, loading the vehicle, and various other situations. Most vehicles have a combination of linkages, shock absorbers (e.g., air, gas, hydraulic, mechanical or spring, etc.), and stabilizer members arranged in a standard suspension architeture. In general, the linkages facilitate movement of the wheels relative to the vehicle, the shock absorbers provide cushioning between the linkages and the vehicle, while the stabilizer members are provided to distribute a load between the various linkages for balancing the vehicle.

The stabilizer members play an important role in balancing the vehicle during maneuvering and various load situations. For example, stabilizer members may be coupled between front and rear suspension assemblies to balance the vehicle during acceleration and deceleration. Stabilizer members also may be coupled between left and right suspension assemblies to balance the vehicle during maneuvering, such as left and right turns. The stabilizer members typically embody metallic bars and other members, which generally extend straight across from one suspension member to another. Accordingly, a pathway must exist between the desired suspension members for these stabilizer members to be installed in the vehicle. This configuration spatially constrains the positioning of other components of the vehicle, such as the engine and transmission. Installation of the stabilizer members is also complicated due to dimensional variations between vehicles and the suspension members. For example, a particular line of vehicles may have tolerances in various components that cause an overall dimensional variation in the distance between the suspension members.

There is a need, therefore, for an improved stabilizer system. There is a particular need for a stabilizer assembly that does not require a straight pathway between the suspension members and is relatively less sensitive to dimensional variations in the vehicle.

SUMMARY OF THE INVENTION

The present technique provides a stabilizer system comprising a plurality of piston cylinder assemblies, which have multiple interconnected chambers to provide cross compensation between suspension members coupled to those piston cylinder assemblies. The piston cylinder assemblies may have two or more chambers separated by pistons, which move in response to a load imposed on the suspension member coupled to that piston cylinder assembly. As the piston moves in response to movement of the corresponding suspension member, a fluid pressure is transmitted to another suspension member to distribute the load between the two suspension members. For example, the present technique may balance a load caused by maneuvering the vehicle between left and right suspension members or it may balance load caused by acceleration or deceleration between front and rear suspension members. Accordingly, the present technique is applicable to any vehicle having movable suspension members, including all sorts of automotive vehicles, motorcycles, bicycles, agricultural vehicles, public transportation vehicles, and any other suitable application.

In one aspect, the present technique provides a stabilizer system for a suspension system. The system comprises first and second piston-cylinder assemblies each comprising a set of variable chambers. The system also includes first and second conduits, each coupled to a desired chamber from each set of variable chambers. The first and second piston-cylinder assemblies are configured for coupling to, and load distribution between, first and second movable suspension members.

In another aspect, the present technique provides a vehicle suspension stabilizer, which comprises a plurality of piston-cylinder assemblies having variable chambers and linkage members configured for coupling to movable suspension members. In this vehicle suspension stabilizer, multiple sets of the variable chambers are fluidly coupled to distribute forces between the movable suspension members.

In another aspect, the present technique provides a method for stabilizing a suspension system. The method comprises mechanically coupling a plurality of pistoncylinder assemblies to a plurality of movable suspension members. The method further comprises fluidly intercoupling chambers from the plurality of piston-cylinder assemblies.

In another aspect, the present technique provides a method for stabilizing a vehicle. The method comprises hydraulically balancing orientations of a plurality of suspension members in response to a load exerted on a first member of the plurality of suspension members.

In another aspect, the present technique provides a method of forming a suspension stabilizer for a vehicle. The method comprises providing a piston-cylinder assembly having multiple chambers disposed about a piston assembly. The method further comprises intercoupling chambers of a plurality of the piston-cylinder assemblies to provide crosswise stabilization between vehicle suspension members connectable to the plurality of pistoncylinder assemblies.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
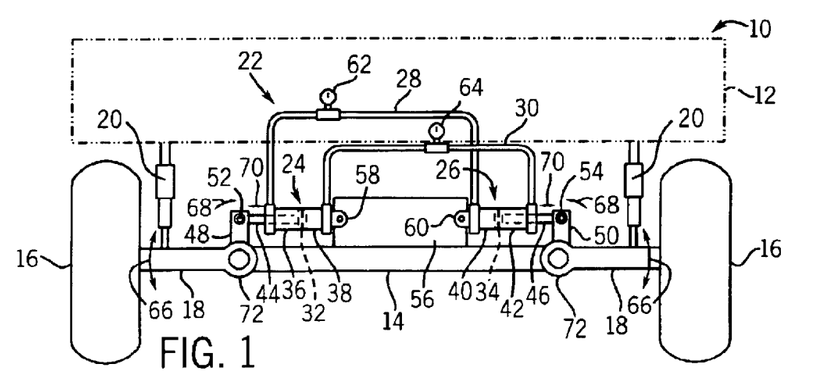
FIG. 1 is a front view of a vehicle having an exemplary suspension system of the present technique, wherein the suspension system comprises a fluid based stabilizer system.

Turning now to the drawings and referring first to FIG. 1, a vehicle is illustrated in accordance with the present technique and designated generally by reference numeral 10. The particular vehicle 10 may embody any automotive vehicle, motorcycle, bicycle, public transportation vehicle, trailer, or any other suitable application requiring cross stabilization between movable members. In this exemplary embodiment, the vehicle 10 comprises a vehicle body 12, a frame 14, wheels 16, suspension arms 18 rotatably coupling the wheels 16 to the frame 14, spring assemblies 20 movably coupling the suspension arms 18 to the vehicle body 12, and a stabilizer assembly 22 movably coupling the suspension arms 18. The stabilizer assembly 22 comprises a plurality of stabilizer devices intercoupled by connectors. For example, the stabilizer devices may comprise piston cylinder assemblies, while the connectors comprise fluid conduits. Alternatively, the stabilizer assemblies may comprise electrical mechanical devices, while the connectors comprise wiring and circuitry to facilitate cross compensation between the electrical mechanical devices. This exemplary configuration facilitates load distribution and motion stabilization without significant space constraints or dimensional dependencies on the various components of the vehicle 10. Moreover, as illustrated in FIGS. 1 through 8, the stabilizer assembly 22 may have any number of intercoupled stabilizer devices in any suitable configuration for interaction with the desired suspension assembly.

Figure 2:
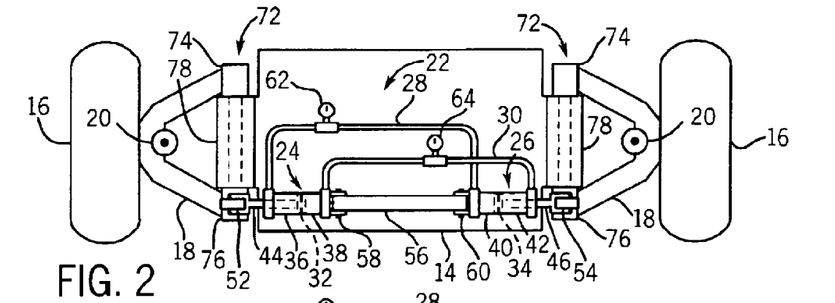
FIG. 2 is a top view of the suspension system illustrated in FIG. 1.

As illustrated in the front and top views of FIGS. 1 and 2, the stabilizer assembly 22 comprises stabilizers 24 and 26 and connectors 28 and 30, which are coupled to the stabilizers 24 and 26 to facilitate cross compensation of the opposite suspension arms 18. The stabilizer assembly 22 also may have a variety of sensors, electronics, computing circuitry, control systems and processors, and various other devices to facilitate control of the stabilizers 24 and 26. These various electronics and devices may form an independent control system or they may be linked to a central control system for the vehicle 10. As mentioned above, the stabilizers 24 and 26 may embody any suitable electrical mechanical devices, such as a linear electric motor, a hydraulic or pneumatic device, or a piston cylinder assembly. However, for illustrative purposes, the stabilizer assembly 22 will be described as a fluid based piston cylinder system.

In this exemplary embodiment of the stabilizer assembly 22, piston assemblies 32 & 34 are disposed centrally within the stabilizers 24 and 26 to form chambers 36 & 38 and 40 & 42, respectively. The piston assemblies 32 & 34 are then movably coupled to the suspension arms 18 via linkages 44 and 46, which are rotatably coupled to torque arms 48 and 50 at joints 52 and 54, respectively. The torque arms 48 and 50 are coupled to the suspension arms 18 at a desired angle (e.g., 90 degrees) to facilitate interaction between the suspension arms 18 and the stabilizers 24 and 26. The stabilizers 24 and 26 are also coupled to a central frame structure 56 via joints 58 and 60, respectively. Accordingly, the piston assemblies 32 & 34 of the stabilizers 24 and 26 are configured for movable interaction with the suspension arms 18.

The stabilizer assembly 22 operates to stabilize motion and distribute a load applied to the suspension arms 18 by flowing fluid between chambers of the stabilizers 24 and 26. Accordingly, the chambers 36 & 40 and 38 & 42 are intercoupled via the connectors 28 and 30, which may embody liquid, pneumatic, or other fluid conduits, as discussed above. The stabilizer assembly 22 also may have a variety of sensors for monitoring and controlling the stabilizers 22 and 26. For example, sensors 62 and 64 may be coupled to the connectors 28 and 30 for monitoring pressure. These sensors 62 and 64 also can be coupled to a control unit, such as a control unit for the vehicle 10 or for the stabilizer assembly 22.

As illustrated in FIGS. 1 and 2 and described above, the stabilizers 24 and 26 of the stabilizer assembly 22 are intercoupled such that any movement (e.g., arrows 66 and 68) of the wheels 16 and the suspension arms 18 will cause movement (e.g., arrows 70) of the respective piston assemblies 32 and 34, thereby transmitting fluid through the connectors 28 and 30 to facilitate balancing between the suspension arms 18. For example, the weight of the vehicle body 12 may shift as the vehicle 10 maneuvers through a turn, as the vehicle crosses a rough terrain, or as the vehicle is loaded with some sort of payload. Accordingly, one or both of the suspension arms 18 may be forced to rotate about pivot joints 72, which rotatably couple the suspension arms 18 to the frame 14.

For example, the left suspension arm 18 may be forced to rotate upwardly, causing the piston assembly 32 to move rightwardly through the stabilizer 24. This rightward movement of the piston assembly 32 expands the chamber 36 and creates a vacuum, which draws fluid from the chamber 40 through the connector 28 and induces the piston assembly 34 to move leftwardly through the stabilizer 26. Accordingly, the leftward movement of the piston assembly 34 forces the right suspension arm 18 to rotate upwardly about the pivot joint 72. The rightward movement of the piston assembly 32 also contracts the chamber 38, thereby forcing fluid to flow through the connector 30 to the chamber 42 of the stabilizer 26. This fluid flow induces the piston assembly 34 to move leftwardly through the stabilizer 26. Again, this leftward movement of the piston assembly 34 forces the right suspension arm 18 to rotate upwardly about the pivot joint 72. Accordingly, as described above, the stabilizer assembly 22 distributes the motion or load on the left suspension arm 18 between the left and right suspension arms 18 to provide a desired balance and stabilization between the left and right suspension arms 18.

As mentioned above, the suspension arms 18, the torque arms 48 and 50, the linkages 44 and 46, and the stabilizers 24 and 26 may embody a variety of the configurations. As illustrated in FIG. 2, the suspension arms 18 have a V-shaped configuration, which has ends 74 and 76 disposed about hinge portions 78 of the frame 14. The stabilizers 24 and 26 are then coupled to the torque arms 48 and 50 at the ends 76. In this exemplary embodiment of FIGS. 1 and 2, the stabilizer assembly 22 may have additional sets of the stabilizers 24 and 26 coupled to the ends 74 and 76.

Figure 3:
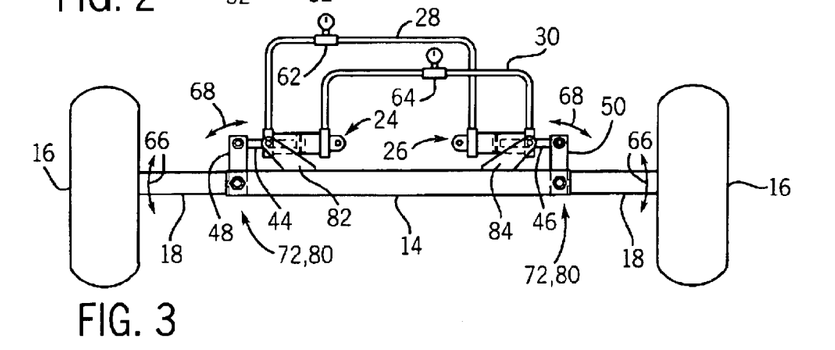
FIG. 3 is a front view of an alternate suspension system of the present technique.
Figure 4:
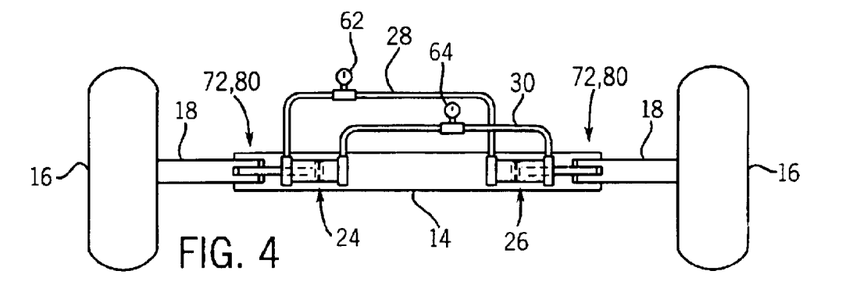
FIG. 4 is a top view of the alternate suspension system.

An alternate embodiment of the suspension arms 18 and the stabilizer assembly 22 is illustrated by the front and top views of FIGS. 3 and 4. In this alternate embodiment, the suspension arms 18 embody a straight structure, which is rotatably disposed in a U-shaped hinge portion 80 of the frame 14. Additionally, the stabilizers 24 and 26 are coupled to the frame via independent mount structures 82 and 84, rather than the central frame structure 56 illustrated in FIGS. 1 and 2. The operation of the stabilizer assembly 22 is similar to that described above with reference to FIGS. 1 and 2.

Figure 5:
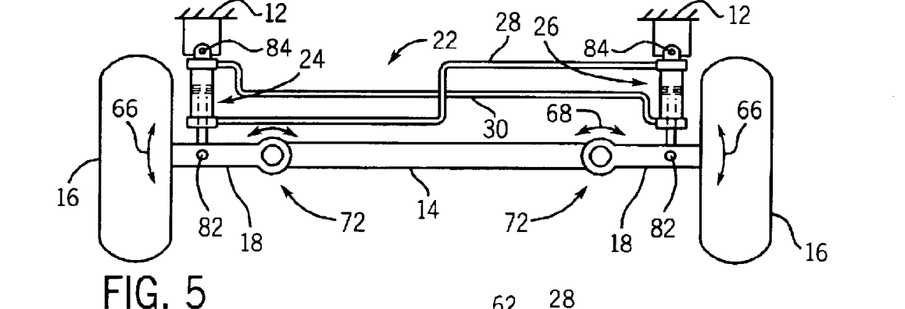
FIGS. 5 through 8 are front views of further alternate embodiments of the exemplary suspension system of the present technique.

The stabilizers 24 and 26 also may be coupled directly to the suspension arms 18, as illustrated in FIG. 5. In this alternate embodiment, the stabilizers 24 and 26 are coupled to the suspension arms 18 and the vehicle body 12 at joints 82 and 84, respectively. The operation of the stabilizer assembly 22 is similar to that described above with reference to FIGS. 1 and 2. In this direct mount configuration, the stabilizers 24 and 26 may replace the spring assemblies 20 illustrated in FIGS. 1 and 2.

Figure 6:
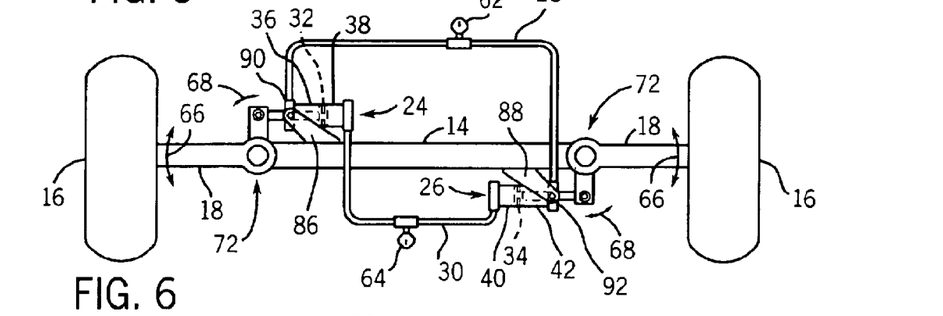

The stabilizers 24 and 26 also may be coupled to upper and lower portions of the frame 14, as illustrated in FIG. 6. In this alternate embodiment, the stabilizers 24 and 26 are coupled to upper and lower mount structures 86 and 88 at joints 90 and 92, respectively. Additionally, the chambers 36 and 40 are intercoupled via the connector 30, while the chambers 38 and 42 are intercoupled via the connector 28. The operation of the stabilizer assembly 22 is similar to that described above with reference to FIGS. 1 and 2, except that the chambers are connected in a different configuration to achieve load distribution and motion stabilization. For example, the left suspension arm 18 may be forced to rotate upwardly, causing the piston assembly 32 to move rightwardly through the stabilizer 24. This rightward movement of the piston assembly 32 expands the chamber 36 and creates a vacuum, which draws fluid from the chamber 42 through the connector 28 and induces the piston assembly 34 to move rightwardly through the stabilizer 26. Accordingly, the rightward movement of the piston assembly 34 forces the right suspension arm 18 to rotate upwardly about the pivot joint 72. The rightward movement of the piston assembly 32 also contracts the chamber 38, thereby forcing fluid to flow through the connector 30 to the chamber 40 of the stabilizer 26. This fluid flow also induces the piston assembly 34 to move rightwardly through the stabilizer 26. Again, this rightward movement of the piston assembly 34 forces the right suspension arm 18 to rotate upwardly about the pivot joint 72. Accordingly, as described above, the stabilizer assembly 22 distributes the motion or load exerted on one or both of the suspension arms 18 between the suspension arms 18 to provide a desired balance and stabilization between the suspension arms 18.

Figure 7:
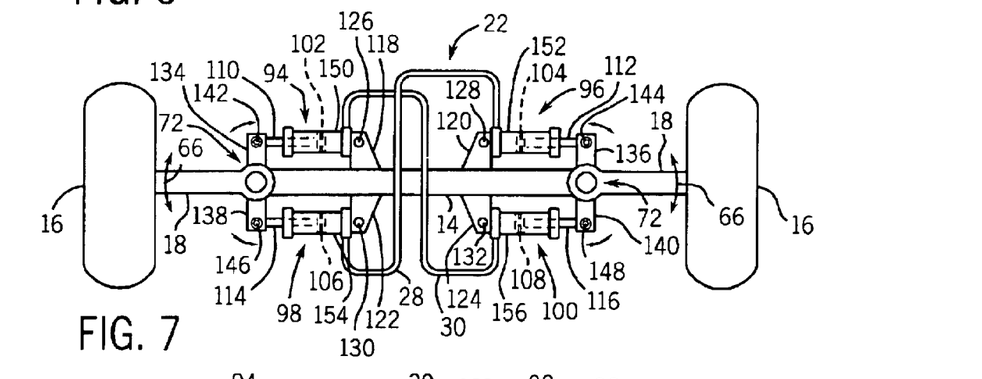
Figure 8:
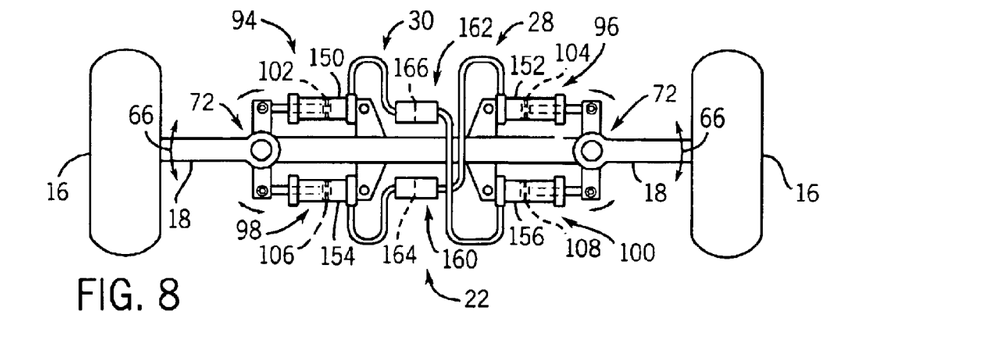

The stabilizer assembly 22 also may have multiple stabilizers coupled to each of the suspension arms 18, as illustrated in FIGS. 7 and 8. In these alternate embodiments, the stabilizer assembly 22 includes stabilizers 94, 96, 98 and 100, which have piston assemblies 102, 104, 106 and 108 and piston linkages 110, 112, 114 and 116, respectively. The stabilizers 94, 96, 98 and 100 are coupled to the frame 14 at mount structures 118, 120, 122 and 124 via joints 126, 128, 130 and 132, respectively. The mount structures 118, 120, 122 and 124 are oriented in the upper left-hand portion, the upper right-hand portion, the bottom left-hand portion, and the bottom right-hand portion of the frame 14, respectively. The piston linkages 110, 112, 114 and 116 are rotatably coupled to the left-hand and right-hand suspension arms 18 at torque arms 134, 136, 138 and 140 via joints 142, 144, 146 and 148, respectively. As illustrated, the torque arms 134 and 138 are disposed adjacent the pivot joint 72 and are oriented in the upper and lower portions of the left-hand suspension arm 18, respectively. The torque arms 136 and 140 are disposed adjacent the pivot joint 72 and are oriented in the upper and lower portions of the right hand suspension arm 18, respectively.

In these alternate embodiments, only one chamber from each of the stabilizers 94–100 is intercoupled with a chamber from another one of the stabilizers 94–100. As illustrated, the stabilizers 94, 96, 98 and 100 include outer chambers 150, 152, 154 and 158, which are defined by the piston assemblies 102, 104, 106 and 108 opposite the piston linkages 110, 112, 114 and 116, respectively. In this quad-stabilizer configuration, the outer chamber 154 is coupled to the outer chamber 152 via the connector 28, while the outer chamber 150 is coupled to the outer chamber 156 via the connector 30.

As noted above, the embodiments of FIGS. 7 and 8 have similar features, except that the alternate embodiment of FIG. 8 includes compensators 160 and 162 disposed along the connectors 28 and 30, respectively. The compensators 160 and 162 may be provided to compensate for volume or pressure differentials between the outer chambers 154 & 152 and 150 & 156, respectively. Alternatively, the compensators 160 and 162 may provide further stability between the left and right suspension arms 18 by controlling or stabilizing the fluid flow between each set of the outer chambers (i.e., outer chambers 154 & 152 and 150 & 156). Accordingly, the compensators 160 and 162 may comprise control members 164 and 166, which may include piston cylinder assemblies, spring assemblies, diaphragms, flexible seals, and other volume or pressure controlling assemblies using metal, plastic, urethane or any suitable material.

The alternate embodiments illustrated in FIGS. 7 and 8 have similar operations, except for the operation of compensators 160 and 162 in the embodiment of FIG. 8. For example, the left suspension arm 18 may be forced to rotate upwardly, causing the piston assembly 102 to move rightwardly through the stabilizer 94 and causing the piston assembly 106 to move leftwardly through the stabilizer 98. The rightward movement of the piston assembly 102 contracts the outer chamber 150, thereby forcing fluid to flow through the connector 30 to the chamber 156 of the stabilizer 100. The fluid flow into the chamber 156 then causes a rightward movement of the piston assembly 100. This rightward movement of the piston assembly 100 forces the torque arm 140 to rotate the right suspension arm 18 upwardly about the pivot joint 72. The leftward movement of the piston assembly 106 expands the outer chamber 154 and creates a vacuum, which draws fluid from the outer chamber 152 through the connector 28 and induces the piston assembly 104 to move leftwardly through the stabilizer 96. Accordingly, the leftward movement of the piston assembly 96 forces the torque arm 136 to rotate the right suspension arm 18 upwardly about the pivot joint 72. The foregoing stabilization mechanism operates in a similar manner, whether the stabilizer assembly 22 is reacting to movement of one or all of the suspension arms 18. Accordingly, as described above, the stabilizer assembly 22 distributes the motion or load exerted on one or both of the suspension arms 18 between the suspension arms 18 to provide a desired balance and stabilization between the suspension arms 18.

As mentioned above, the present technique may utilize various volume and pressure compensators to accommodate volume differentials between intercoupled chambers and to provide additional stabilization between the stabilizers 24 and 26. Although the stabilizers 24 and 26 may simply embody dual chamber enclosures having a single piston assembly, the stabilizer assembly 22 may incorporate relief valves, pressure regulators, volume expansion/contraction chambers, diaphragms, overflow chambers, spring assemblies, and various other mechanisms to control volume and pressure differentials. The embodiment of FIG. 8 incorporates the compensators 160 and 162 into the connectors 28 and 30, respectively. However, any of the foregoing features may be incorporated into the connectors 28 and 30, the chambers 36–42, the piston assemblies 32 and 34, or any portion of the stabilizer assembly 22.

FIGS. 9–12 illustrate various embodiments of the stabilizers 24 and 26 and the corresponding piston assemblies 32 and 34, respectively. In these exemplary embodiments, one or both of the piston assemblies 32 and 34 comprise multiple pistons disposed about a central chamber having a spring or compressible fluid, such as a liquid or gas. Accordingly, the central chamber accommodates pressure and volume differentials as fluid is transferred between chambers 36 and 40 and chambers 38 and 42.

Figure 9:
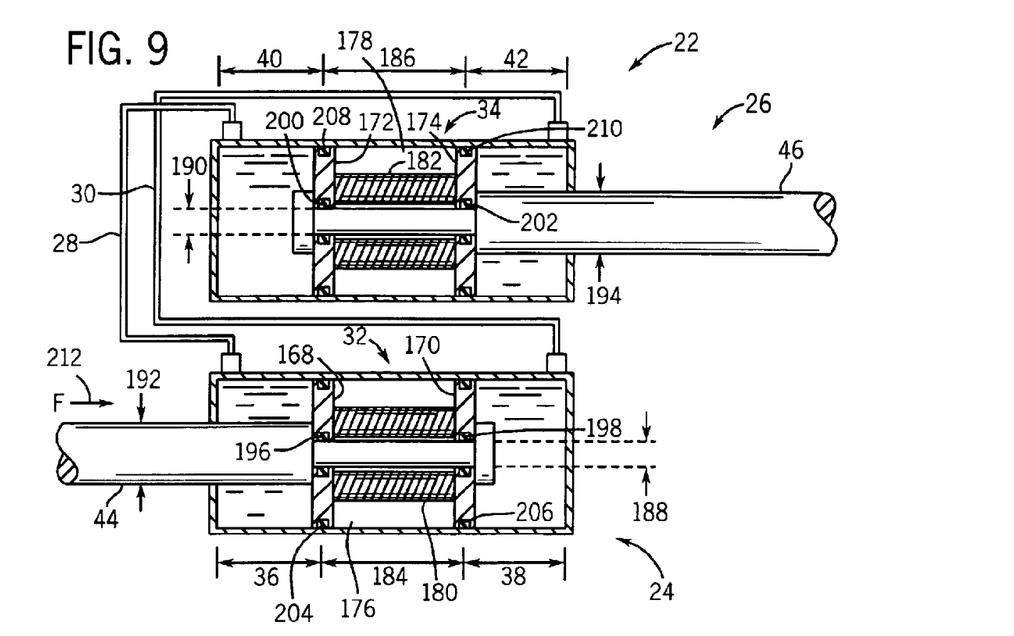
FIGS. 9 through 12 are cross-sectional views of various embodiments of the exemplary fluid based stabilizer system of the present technique.

In the embodiment of FIG. 9, the piston cylinder assemblies 32 and 34 comprise piston members 168 & 170 and 172 & 174 disposed about central chambers 176 and 178 having spring assemblies 180 and 182, respectively. The piston cylinder assemblies 32 and 34 are disposed about sections 184 and 186 of the linkages 44 and 46, respectively. These sections 184 and 186 have diameters 188 and 190, which are relatively smaller than diameters 192 and 194 of the linkages 44 and 46, respectively. Accordingly, movement of the piston cylinder assemblies 32 and 34 is limited to expansion and contraction within the sections 184 and 186, respectively. The piston members 168, 170, 172 and 174 are movably sealed along their respective sections 184 and 186 via inner seal members 196, 198, 200 and 202, respectively. The piston members 168, 170, 172 and 174 are also movably sealed within the stabilizers 24 and 26 via outer seal members 204, 206, 208 and 210, respectively. These seal members 196–210 may embody any suitable seal structure and material, such as a rubber, plastic or metallic O-ring.

Operation of the stabilizer assembly 22 of FIG. 9 is best illustrated by example. If the left suspension arm 18 is forced to rotate upwardly, then a force 212 is exerted on the linkage 44 of the stabilizer 24. The piston assembly 32 is then forced to move rightwardly through the stabilizer 24. This rightward movement of the piston assembly 32 expands the chamber 36 and creates a vacuum, which draws fluid from the chamber 40 through the connector 28 and induces the piston assembly 34 to move leftwardly through the stabilizer 26. However, the volumes of chambers 36 and 40 are not equal, because chamber 36 is partially consumed by the linkage 44. Accordingly, one or both of the piston assemblies 32 and 34 may operate to accommodate the volume differential between the chambers 36 and 40. For example, the piston members 168 and 170 may contract in the central chamber 176 and/or the piston members 172 and 174 may expand in the central chamber 178. However, in the present example, the force 212 is being applied against the piston member 168, which is abutted against the diameter 192 of the linkage 44. This interaction may limit the foregoing contraction or expansion by the piston members 168 and 172. Instead, the volume differential may be accommodated between the chambers 38 and 42. In either case, the rightward movement of the piston assembly 34 forces the right suspension arm 18 to rotate upwardly about the pivot joint 72, while the piston assemblies 32 and 34 maintain a pressure or volume balance within the stabilizer assembly 22.

The rightward movement of the piston assembly 32 also contracts the chamber 38, thereby forcing fluid to flow through the connector 30 to the chamber 42 of the stabilizer 26. This fluid flow induces the piston assembly 34 to move leftwardly through the stabilizer 26, thereby forcing the right suspension arm 18 to rotate upwardly about the pivot joint 72. Again, the volumes of chambers 38 and 42 are not equal, because chamber 42 is partially consumed by the linkage 46. Accordingly, one or both of the piston assemblies 32 and 34 may operate to accommodate the volume differential between the chambers 38 and 42. In this scenario, the piston member 174 may contract inwardly in the central chamber 178 to accommodate the larger volume being transferred from the chamber 38 to the chamber 42. However, as the stabilizer assembly 22 transfers fluids simultaneously between the chambers 36 & 40 and 38 & 42, forces are exerted on both ends of the piston assemblies 32 and 34 due to the volume differentials between those respective chambers. Accordingly, these volume differentials may at least partially cooperate to facilitate the desired movement of the linkages 44 and 46, while the piston assemblies 32 and 34 may accommodate any remaining pressure differentials, volume differentials, or time response lags between the linkages 44 and 46. Again, as described above, the stabilizer assembly 22 distributes the motion or load exerted on one or both of the suspension arms 18 between the suspension arms 18 to provide a desired balance and stabilization between the suspension arms 18. During this balancing or stabilizing process, the piston assemblies 32 and 34 maintain a pressure or volume balance within the stabilizer assembly 22.

Figure 10:
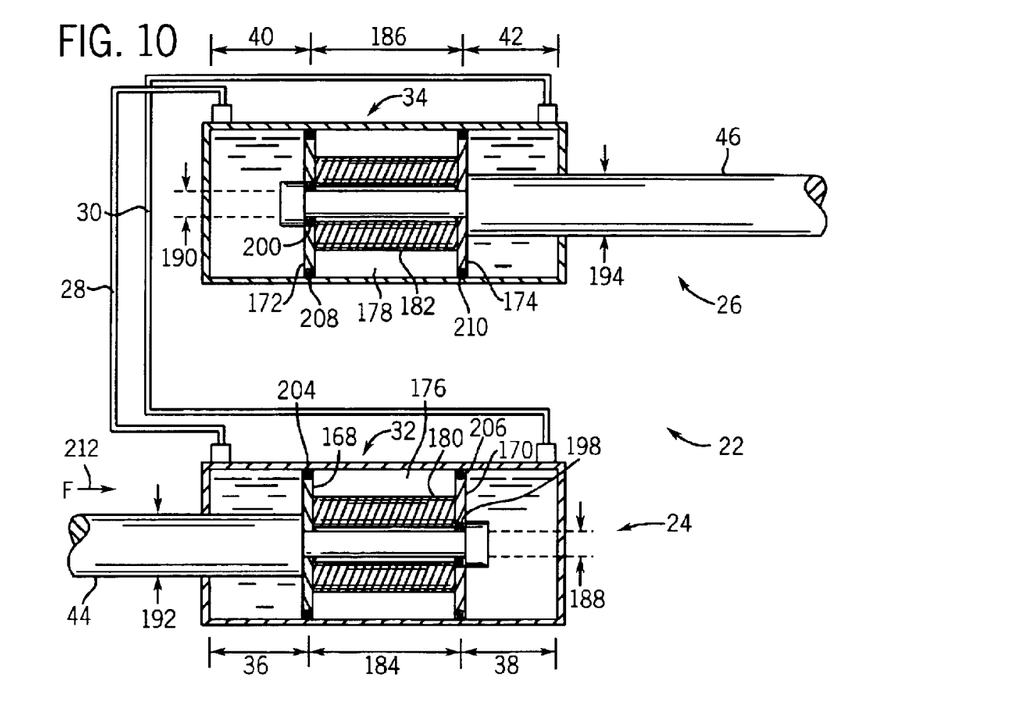

The embodiment illustrated in FIG. 10 has similar features to that of FIG. 9, with several exceptions. As in FIG. 9, the piston cylinder assemblies 32 and 34 comprise piston members 168 & 170 and 172 & 174 disposed about central chambers 176 and 178 having spring assemblies 180 and 182, respectively. The piston cylinder assemblies 32 and 34 are also disposed on sections 184 and 186 of the linkages 44 and 46, respectively. However, in this alternate embodiment, the piston members 168 and 174 are fixedly coupled to the linkages 44 and 46, while the piston members 170 and 172 remain movably sealed along their respective sections 184 and 186 via the inner seal members 198 and 200, respectively. The piston members 168, 170, 172 and 174 also remain movably sealed within the stabilizers 24 and 26 via the outer seal members 204, 206, 208 and 210, respectively. Accordingly, the stabilizer assembly 22 operates similar to that described above with reference to FIG. 9, except that the piston assemblies 32 and 34 are variable only by movement of the piston members 170 and 172, respectively.

Figure 11:
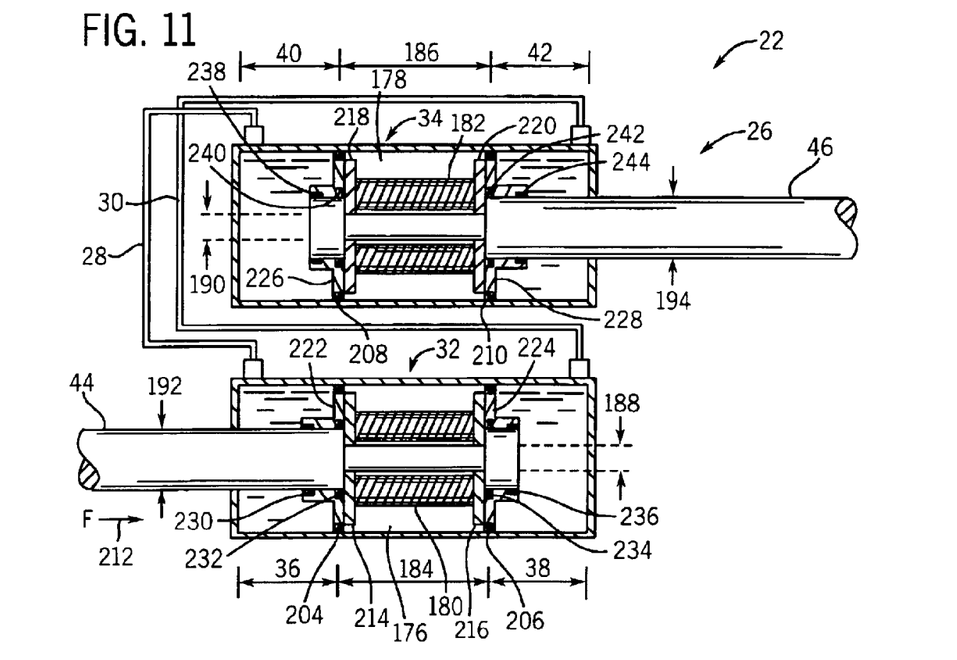

The embodiment illustrated in FIG. 11 also has similar features to that of FIG. 9, with several other exceptions. In this alternate embodiment, the piston cylinder assemblies 32 and 34 comprise support members 214 & 216 and 218 & 220, which are disposed about the central chambers 176 and 178 and the spring assemblies 180 and 182 on sections 184 and 186 of the linkages 44 and 46, respectively. The piston cylinder assemblies 32 and 34 also have piston members 222 & 224 and 226 & 228 disposed about the support members 214 & 216 and 218 & 220 along the larger diameters 192 and 194 of the linkages 44 and 46, respectively. Accordingly, in this configuration, the piston members 222 & 224 and 226 & 228 are allowed to move freely along the linkages 44 and 46 independent of the central chambers 176 and 178 and the spring assemblies 180 and 182, respectively. The piston members 222, 224, 226 and 228 are movably sealed along their respective sections of the linkages 44 and 46 via inner seal members 230 & 232, 234 & 236, 238 & 240 and 242 & 244, respectively. The piston members 222 & 224 and 226 & 228 are also movably sealed within the stabilizers 24 and 26 via outer seal members 204, 206, 208 and 210, respectively. As discussed above, the foregoing seal members may embody any suitable seal structure and material, such as a rubber, plastic or metallic O-ring. Accordingly, the stabilizer assembly 22 illustrated in FIG. 11 operates similar to that described above with reference to FIG. 9, except that the piston assemblies 32 and 34 have additional volume control as provided by the freely movable configuration of the piston members 222–228. In operation, the piston members 222–228 freely move within their respective chambers until the volume or pressure differential is sufficient to force the piston members 222–228 against their respective support members 214–220. In a sense, the central cavities 176 and 178 and corresponding spring assemblies 180 and 182 act as overflow chambers or pressure regulators for the chambers 36–42, which are otherwise freely variable by the piston members 222–228.

Figure 12:
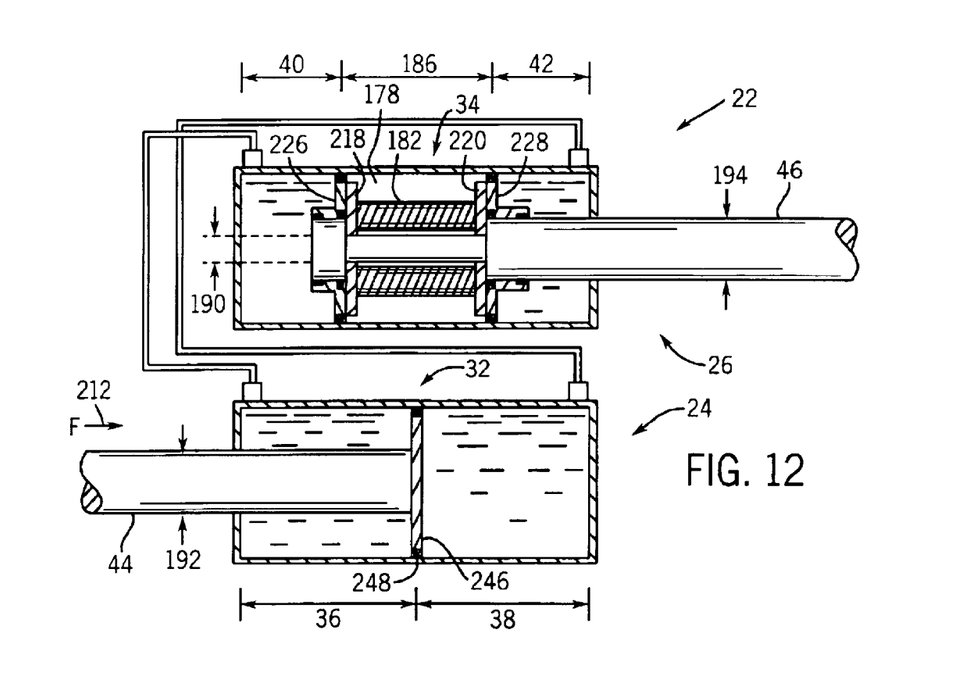

The embodiment illustrated in FIG. 12 has similar features to that of FIG. 11, with a significant modification to the stabilizer 24. In this alternate embodiment, the stabilizer 26 has essentially the same features as illustrated in FIG. 11, while the stabilizer 24 has a simplified piston cylinder structure. The piston cylinder assembly 32 comprises a single piston member 246, which is fixedly coupled to an end of the linkage 44 and is movably sealed within the stabilizer 24 via an outer seal member 248. As in FIG. 11, the piston cylinder assembly 34 comprises the piston members 226 and 228 disposed freely about the support members 218 and 220 and the spring assembly 182. In this configuration, the central chamber 178 and the corresponding components accommodate the pressure and volume differentials for both pairs of chambers 36 & 40 and 38 & 42. Accordingly, the stabilizer assembly 22 illustrated in FIG. 11 operates similar to that described above with reference to FIG. 9, except that the piston assemblies 32 and 34 only provide volume control in the chambers 40 and 42.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A stabilizer system for a suspension system, comprising:

first and second piston-cylinder assemblies each comprising a set of variable chambers, wherein at least one of the first and second piston-cylinder assemblies comprises a spring assembly, wherein the set of variable chambers have inversely variable volumes, wherein each of the first and second piston-cylinder assemblies comprise a closed cylinder, a piston assembly movably disposed in the closed cylinder, and at least first and second chambers of the set of variable chambers disposed on opposite sides of the piston assembly, wherein the piston assembly for at least one of the first and second piston-cylinder assemblies comprises first and second pistons disposed about an intermediate chamber; and first and second conduits each coupled to a desired chamber from each set of variable chambers;

wherein the first and second piston-cylinder assemblies are configured to stabilize first and second movable suspension members without active control.

2. The stabilizer system of claim 1, wherein the desired chambers comprise inverse pairs of the first and second chambers from the sets of variable chambers.

3. The stabilizer system of claim 1, wherein at least one of the first and second chambers comprises a linkage member having first and second ends, the first end coupled to the piston assembly and the second end extending through a wall of the closed cylinder for coupling to a desired one of the first and second movable suspension members.

4. The stabilizer system of claim 1, wherein the intermediate chamber is configured to compensate for volume differentials between first and second pairs of the desired chambers coupled via the first and second conduits, respectively.

5. The stabilizer system of claim 1, wherein the intermediate chamber comprises a spring assembly.

6. The stabilizer system of claim 1, wherein at least one of the first and second pistons is fixed to a linkage member extending through a wall of the closed cylinder for coupling to a desired one of the first and second movable suspension members.

7. The stabilizer system of claim 1, wherein the first and second piston-cylinder assemblies comprise a plurality of closed cylinders each comprising a piston assembly movably disposed therein and first and second chambers of the set of variable chambers disposed on opposite sides of the piston assembly.

8. The stabilizer system of claim 7, wherein the desired chambers for each of the first and second conduits comprise a desired pair of the first chambers.

9. The stabilizer system of claim 8, comprising a variable volume chamber assembly.

10. The stabilizer system of claim 9, wherein the variable volume chamber assembly comprises a diaphragm.

11. The stabilizer system of claim 9, wherein the variable volume chamber assembly comprises a spring-loaded piston-cylinder assembly.

12. The stabilizer system of claim 1, wherein the set of variable chambers comprise a fluid.

13. The stabilizer system of claim 1, wherein the set of variable chambers comprise a gas.

14. A vehicle suspension stabilizer, comprising:

a plurality of piston-cylinder assemblies comprising variable chambers, a spring assembly, and linkage members configured for coupling to movable suspension members, wherein multiple sets of the variable chambers are passively fluidly coupled to distribute forces between the movable suspension members;

wherein each of the plurality of piston-cylinder assemblies comprises a closed cylinder, a piston assembly movably disposed in the closed cylinder, and first and second chambers of the variable chambers disposed on opposite sides of the piston assembly; and wherein the piston assembly for at least one of the plurality of piston-cylinder assemblies comprises at least two pistons disposed about an intermediate chamber.

15. The vehicle suspension stabilizer of claim 14, wherein the multiple sets of the variable chambers comprise a first coupled set of the first chambers from a first desired set from the plurality of piston-cylinder assemblies.

16. The vehicle suspension stabilizer of claim 15, wherein the multiple sets of the variable chambers comprise a second coupled set of the first chambers from a second desired set from the plurality of piston-cylinder assemblies.

17. The vehicle suspension stabilizer of claim 14, wherein the multiple sets of the variable chambers comprise a first inversely coupled pair of the first and second chambers from a first desired pair from the plurality of piston-cylinder assemblies.

18. The vehicle suspension stabilizer of claim 17, wherein the multiple sets of the variable chambers comprise a second inversely coupled pair of the first and second chambers from a second desired pair from the plurality of piston-cylinder assemblies.

19. The vehicle suspension stabilizer of claim 17, wherein the multiple sets of the variable chambers comprise a second inversely coupled pair of the second and first chambers from the first desired pair.

20. The vehicle suspension stabilizer of claim 14, wherein the intermediate chamber comprises a resistance mechanism.

21. The vehicle suspension stabilizer of claim 20, wherein the resistance mechanism comprises a spring assembly.

22. The vehicle suspension stabilizer of claim 20, wherein the resistance mechanism comprises a fluid.

23. The vehicle suspension stabilizer of claim 14, comprising a resistance mechanism disposed between at least one of the multiple sets.

24. The vehicle suspension stabilizer of claim 23, wherein the resistance mechanism comprises a diaphragm.

25. The vehicle suspension stabilizer of claim 23, wherein the resistance mechanism comprises a spring-loaded piston-cylinder assembly.

26. A method for stabilizing a suspension system, comprising:
    mechanically coupling a plurality of piston-cylinder assemblies having a spring assembly to a plurality of movable suspension members; and
    fluidly intercoupling chambers from the plurality of piston-cylinder assemblies, without active control between the chambers, to provide stabilization between the plurality of movable suspension members;
    wherein each of the plurality of piston-cylinder assemblies comprises a closed cylinder, a piston assembly movably disposed in the closed cylinder, and first and second chambers disposed on opposite sides of the piston assembly; and
    wherein the piston assembly for at least one of the plurality of piston-cylinder assemblies comprises at least two pistons disposed about an intermediate chamber.

27. The method of claim 26, wherein mechanically coupling the plurality of piston-cylinder assemblies comprises linking the piston assemblies to the plurality of movable suspension members.

28. The method of claim 27, wherein mechanically coupling the plurality of piston-cylinder assemblies comprises positioning the plurality of piston-cylinder assemblies to facilitate interaction between the plurality of movable suspension members and the piston assemblies.

29. The method of claim 28, wherein fluidly intercoupling chambers comprises coupling a first conduit to a first chamber pair from a first pair of piston-cylinder assemblies from the plurality of piston-cylinder assemblies.

30. The method of claim 29, wherein coupling the first conduit to the first chamber pair comprises intercoupling the first chambers from the first pair.

31. The method of claim 30, wherein fluidly intercoupling chambers comprises coupling a second conduit to a second chamber pair from a second pair of piston-cylinder assemblies from the plurality of piston-cylinder assemblies.

32. The method of claim 29, wherein coupling the first conduit to the first chamber pair comprises intercoupling first and second chambers from the first pair.

33. The method of claim 32, wherein fluidly intercoupling chambers comprises coupling a second conduit to a second chamber pair of the first and second chambers from the first pair, the first and second chamber pairs comprising inverse pairs of the first and second chambers from the first pair.

34. The method of claim 26, comprising distributing a force, which is exerted on at least one member of the plurality of movable suspension members, between at least two members of the plurality of movable suspension members.

35. The method of claim 34, wherein distributing the force comprises fluidly transmitting the force through a desired stabilizer set of piston-cylinder assemblies of the plurality of piston-cylinder assemblies coupled to the at least two members.

36. The method of claim 35, wherein fluidly transmitting the force comprises facilitating balanced motion of the at least two members.

37. The method of claim 36, wherein facilitating balanced motion of the at least two members comprises utilizing the desired stabilizer set to provide multiple cross-compensation between the at least two members.

38. A method of forming a suspension stabilizer for a vehicle, comprising:
    providing a plurality of piston-cylinder assemblies, each comprising multiple chambers and at least one spring assembly disposed about a piston assembly, wherein providing the plurality of piston-cylinder assemblies comprises:
        forming first and second closed chambers about the piston assembly and extending a linkage from the piston assembly through and outwardly from an outer wall of at least one of the plurality of piston-cylinder assemblies; and
        providing an intermediate chamber between first and second pistons of the piston assembly to compensate for volume differentials; and
    passively intercoupling chambers of the plurality of the piston-cylinder assemblies to provide crosswise stabilization, without pumping assistance, between vehicle suspension members connectable to the plurality of piston-cylinder assemblies.

39. The method of claim 38, wherein providing the intermediate chamber comprises disposing a resistance mechanism between the first and second pistons.

40. The method of claim 38, wherein passively intercoupling chambers comprises coupling a first conduit to first chambers from a first pair of piston-cylinder assemblies from the plurality of piston-cylinder assemblies.

41. The method of claim 40, wherein passively intercoupling chambers comprises coupling a second conduit to first chambers from a second pair of piston-cylinder assemblies from the plurality of piston-cylinder assemblies, wherein each of the first and second pairs are configured for hydraulic interaction with first and second members of the vehicle suspension members.

42. The method of claim 38, wherein passively intercoupling chambers comprises coupling a first conduit to first and second chambers from a first pair of piston-cylinder assemblies from the plurality of piston-cylinder assemblies.

43. The method of claim 42, wherein passively intercoupling chambers comprises coupling a second conduit to the first and second chambers from the first pair, the first and second conduits coupling inverse pairs of the first and second chambers from the first pair.

44. The stabilizer system of claim 1, wherein the first and second piston-cylinder assemblies comprise a working medium that is moved through the first and second conduits only in response to loads on the first and second movable suspension members.

45. The stabilizer system of claim 1, wherein the spring assembly comprises a coil spring.

46. The vehicle stabilizer system of claim 14, comprising a working medium that is moved between the plurality of piston-cylinder assemblies without assistance by a pump.

47. The vehicle stabilizer system of claim 14, comprising a working medium that is moved between the plurality of piston-cylinder assemblies without external feedback influence.

48. A system for stabilizing suspension of a vehicle, comprising:
    a first cylinder having a first chamber and a second chamber separated by a first piston movably disposed along the first cylinder, wherein the first piston has a first linkage extending through the first chamber and out of the first cylinder, wherein the first linkage is configured to couple with a first suspension member of the vehicle;

a second cylinder having a third chamber, a fourth chamber, and a fifth chamber, wherein the third and fourth chambers are separated by a second piston movably disposed along the second cylinder, wherein the fourth and fifth chambers are separated by a third piston movably disposed along the second cylinder, wherein the second piston has a second linkage extending through the third chamber and out of the second cylinder, wherein the second linkage is configured to couple with a second suspension member of the vehicle;

a spring disposed between the second and third pistons;

a first conduit coupled to the first chamber and to the fifth chamber; and a second conduit coupled to the second chamber and to the third chamber, wherein the system is configured to stabilize the first and second suspension members without external feedback influence on the passage of a working medium passing through the first or second conduits.

49. The system of claim 48, wherein the first and second conduits consist essentially of substantially continuous conduits configured to exchange a working medium between the first and second cylinders.

50. The system of claim 48, wherein the first and second conduits are configured to exchange the working medium passively between the first and second cylinders without a pump of electronic control.

51. The system of claim 48, wherein the first piston comprises a first piston member fixedly coupled to the first linkage, a second piston member offset from the first piston member, and a spring member disposed between the first and second piston members, wherein the first and second piston members define another separate chamber between the first and second chambers.

52. The system of claim 48, wherein the spring comprises a coil spring.

* * * * *